US 6,561,591 B2

(12) United States Patent  
Zimet (10) Patent No.: US 6,561,591 B2  
(45) Date of Patent: May 13, 2003

(54) WHEEL ASSEMBLY (75) Inventor: Daniel B. Zimet, South Euclid, OH (US)

(73) Assignee: The Scott Fetzer Company, Westlake, OH (US)

( * ) Notice: Subject to any disclaimer, the term of this patent is extended or adjusted under 35 U.S.C. 154(b) by 0 days.

(21) Appl. No.: 09/876,615

(22) Filed: Jun. 7, 2001

(65) Prior Publication Data

US 2002/0185907 A1 Dec. 12, 2002

(51) Int. Cl.[7] .................................................. B60B 1/06
(52) U.S. Cl. ...................... 301/5.1; 301/5.306; 301/5.7
(58) Field of Search ................................. 301/5.1, 5.23, 301/5.7, 5.305, 5.301, 5.306, 64.706, 64.301, 111.01, 111.03; 384/192, 203, 206, 208, 209; 180/7.1, 20, 21; 280/28.5, 11.226; 16/45, 24

(56) References Cited

U.S. PATENT DOCUMENTS

| ,499,525 | A | | 6/1893 | Dodge | |
|---|---|---|---|---|---|
| 521,181 | A | * | 6/1894 | Riedel | 16/28 |
| 1,976,068 | A | | 10/1934 | Higbee | |
| 2,173,973 | A | | 9/1939 | Leighton | |
| 3,040,371 | A | * | 6/1962 | Rice et al. | 16/45 |
| 3,405,540 | A | * | 10/1968 | Johnson | 152/21 |
| 3,608,236 | A | | 9/1971 | Beny et al. | |
| 3,720,449 | A | | 3/1973 | Godin | |
| 3,985,392 | A | * | 10/1976 | Bergmann et al. | 301/64.706 |
| 4,090,283 | A | * | 5/1978 | Woolley | 301/5.3 |
| 4,353,428 | A | | 10/1982 | Kovar et al. | |
| 4,519,466 | A | * | 5/1985 | Shiraishi | 180/7.1 |
| 4,752,079 | A | | 6/1988 | Fahrner | |
| 4,761,083 | A | * | 8/1988 | Smith et al. | 384/208 |
| 5,265,965 | A | * | 11/1993 | Harris et al. | 384/208 |
| 5,294,187 | A | * | 3/1994 | Racicot | 301/5.1 |
| 5,463,811 | A | * | 11/1995 | Aureli et al. | 384/208 |
| 5,480,231 | A | * | 1/1996 | Sasaki et al. | 384/206 |
| 5,704,091 | A | | 1/1998 | Kilström | |
| 5,755,008 | A | | 5/1998 | Rose | |
| 5,797,661 | A | | 8/1998 | Lee et al. | |
| 5,810,450 | A | * | 9/1998 | Tsu et al. | 301/5.3 |
| 5,833,324 | A | | 11/1998 | Conradsson | |
| 5,942,068 | A | * | 8/1999 | Adams et al. | 301/5.3 |
| 6,106,074 | A | * | 8/2000 | Chang | 301/5.3 |

FOREIGN PATENT DOCUMENTS

JP 63-203401 8/1988

* cited by examiner

Primary Examiner—S. Joseph Morano  
Assistant Examiner—Long Bae Nguyen  
(74) Attorney, Agent, or Firm—Jones Day (57) ABSTRACT

An apparatus includes first and second wheel sections configured to mate in axially opposed relationship to define a rotatable wheel body. The wheel body has a peripheral outer surface extending circumferentially about an axis of rotation and a bearing cavity centered on the axis. Each of the wheel sections has an axial projection and an axial recess configured to receive the projection on the other of the wheel sections. This limits rotation of the wheel sections relative to each other about the axis when the wheel sections are received in the axially opposed relationship.

43 Claims, 10 Drawing Sheets

Fig.16 ated Sep 13, 2022
WHEEL ASSEMBLY

FIELD OF THE INVENTION

The present invention relates to a wheel assembly for bearing the weight of a body, such as a vacuum cleaner, while rolling about on an open surface.

BACKGROUND OF THE INVENTION

An upright vacuum cleaner typically has a pair of front wheels and a pair of rear wheels mounted on a front axle and a rear axle, respectively. As the vacuum cleaner is pushed forward and pulled backward, it can be is steered in an arcuate path along the floor. In some cases, the front wheels can swivel to facilitate steering.

SUMMARY OF THE INVENTION

The present invention provides an apparatus including first and second wheel sections configured to mate in axially opposed relationship to define a rotatable wheel body. The wheel body has a peripheral outer surface extending circumferentially about an axis of rotation, and has a bearing cavity centered on the axis. Each of the wheel sections has an axial projection and an axial recess configured to receive the projection on the other wheel section. This limits rotation of the wheel sections relative to each other about the axis when the wheel sections are received in the axially opposed relationship.

In accordance with another feature of the invention, the wheel body further has a cavity and a bore. The cavity is centered on the axis and is configured to receive a bearing. The bore extends axially outward from the cavity to the outer surface. The bearing is receivable within the cavity, and has a bore configured to receive an axle inserted through the bore in the wheel body. The bearing and the wheel body together are configured to define a limited range of rotational movement of the wheel body relative to the bearing.

In accordance with yet another feature of the invention, an apparatus comprises a hubcap having a first outer surface with a spherical contour centered on an axis of rotation. The first outer surface has a first radius of curvature, and has a circular first edge extending circumferentially about the axis. A tread has a second outer surface with a spherical contour that is concentric with the contour of the first outer surface. The second outer surface has a second radius of curvature equal to the first radius of curvature. A circular second edge of the second outer surface extends circumferentially about the axis radially outward of the first circular edge.

In still another feature of the invention, an apparatus comprises a rotatable wheel body with a peripheral outer surface extending circumferentially about an axis of rotation, a bearing cavity centered on the axis, and a bore surface defining a bore extending axially outward from the bearing cavity. A hubcap is configured to have an installed position on the wheel body. The hubcap has ribs. Each rib has an axially extending edge configured to guide the hubcap along while the hubcap is being installed. The ribs may be spaced radially from the surrounding bore surface, or alternatively may be configured to contact the bore surface, when the hubcab is in the installed position.

The invention further provides an apparatus comprising a ball joint that includes a ball rotatably received in a socket. A cylindrical inner surface of the ball is centered on a first axis and defines a bore in the ball. An alignment tool rotates the ball relative to the socket. A tapered tip of the alignment tool is centered on a second axis. The tapered tip is configured to rotate the ball to align the first axis with the second axis when the tapered tip is moved along the second axis into the bore. A body portion of the alignment tool extends from the tapered tip, and is centered on the second axis. The body portion has a cylindrical outer diameter that is sized to enable the body portion to be telescopically received within the cylindrical inner surface and to limit rotation of the ball relative to the body portion when the body portion is received within the bore.

Further in accordance with the invention, the wheel body preferably has a spherical outer surface configured to roll about an open surface. A socket of the wheel body is centered on an axis of rotation and is configured to receive a ball. A bore extends axially outward from the socket and is configured to receive an axle. The bore has a conical beveled surface at an outer end of the bore. The ball is receivable within the socket to form a ball joint. The axle is receivable within the bore and is attachable to the ball. The beveled surface is configured to be pivotally movable into abutting line contact with the axle when the wheel body, the ball and the axle are assembled together.

According to another feature, a wheel of a vacuum cleaner comprises a socket and a ball received within the socket to form a ball joint such that the socket is rotatable about the ball. The wheel further comprises an axle fastened to the ball such that the ball is rotatable about the axle.

Additionally, an apparatus constructed in accordance with the invention may comprise a rotatable wheel body having a socket configured to receive a ball. A first bore extends axially outward from the socket and is configured to receive an axle. The ball is configured to be received within the socket. The ball has a second bore configured to receive the axle. A first abutment shoulder extends radially inward within the second bore. The axle is receivable within the first and second bores. The axle has an end surface and a third bore extending axially inward through the end surface. The third bore is configured to receive a fastener. The fastener is receivable within the third bore for fastening the axle to the ball. The fastener has a head portion that faces both the first abutment shoulder and the end surface of the axle when the axle is fastened to the ball.

DESCRIPTION OF THE INVENTION

Figure 1:
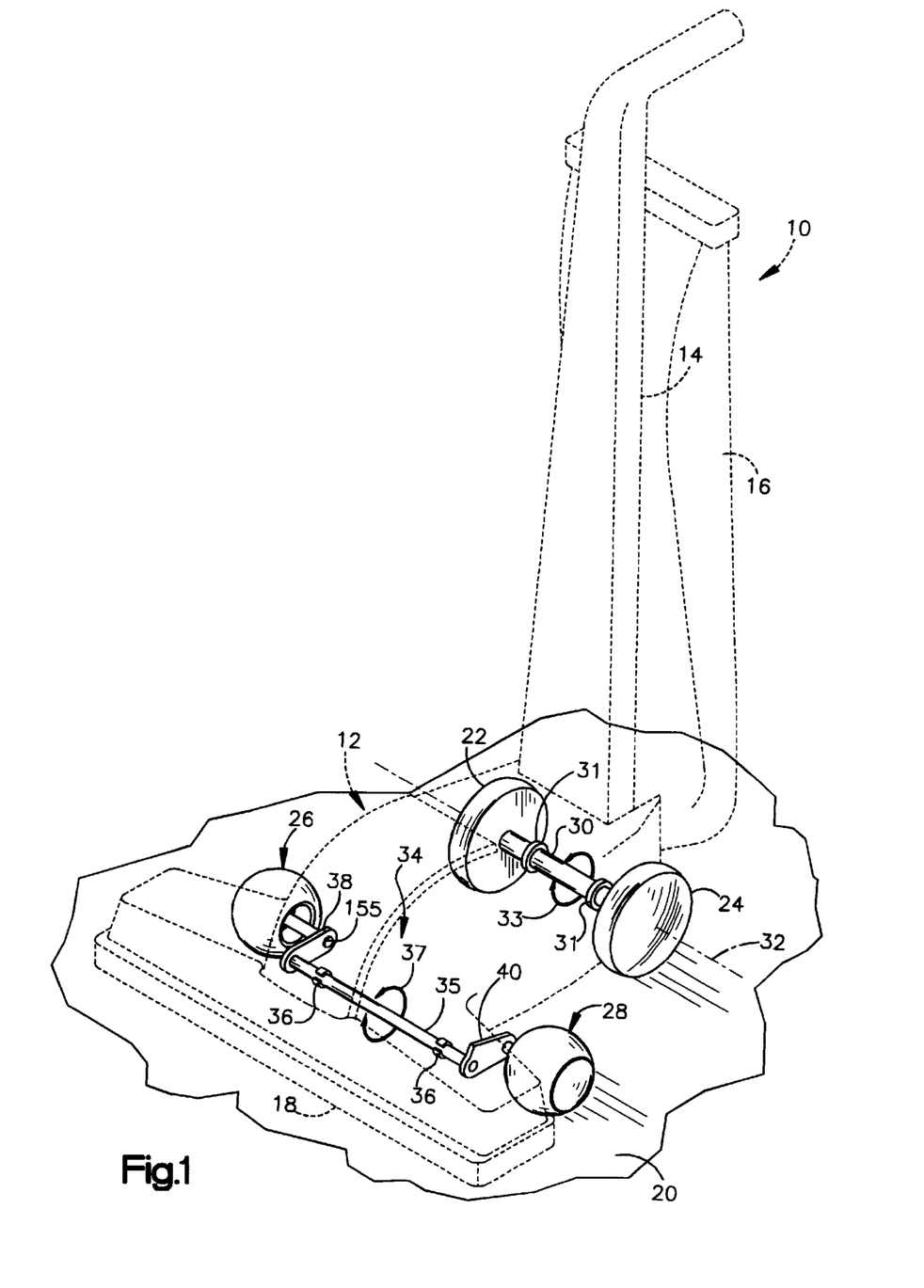
FIG. 1 is a schematic view of a vacuum cleaner embodying the present invention.

FIG. 1 schematically shows a vacuum cleaner 10 embodying the present invention. The vacuum cleaner 10 has a base 12, a handle 14 and a filter bag 16. The base 12 includes a nozzle 18 that is positioned over a floor 20, and also includes a fan (not shown) for generating an air stream from the nozzle 18 to the filter bag 16. Dirt from the floor 20 is entrained in the air stream and is deposited in the filter bag 16. An operator uses the handle 14 to maneuver the base 12 along the floor 20.

The base 12 is supported by two rear wheels 22 and 24 and two front wheel assemblies 26 and 28. The rear wheels 22 and 24 are affixed to a rear axle 30. The rear axle 30 is mounted to the base 12 by two low-friction sleeves 31 that are affixed to the base 12. The rear wheels 22 and 24 are thus rotatable relative to the base 12 only about a central axis 32 of the rear axle 30, as indicated by the arrow 33.

A pivoting lever assembly 34 connects the two front wheel assemblies 26 and 28 to the base 12 in a known manner that enables adjusting the height of the nozzle 18 from the floor 20. A central bar 35 of the lever assembly 34 is mounted to the base 12 by two brackets 36. A ratchet assembly (not shown) is operative between the central bar 35 and the base 12. In a manner known in the art, the ratchet assembly rotates the central bar 35 relative to the base 12, as indicated by the arrow 37. The front wheel assemblies 26 and 28 are attached to the central bar 35 through two lever arms 38 and 40. In this arrangement, the height of the nozzle 18 from the floor 20 is adjusted by rotating the central bar 35 by use of the ratchet assembly.

The front wheel assemblies 26 and 28 are alike but are oriented oppositely relative to each other. Each wheel assembly 26 and 28 thus has the structure shown in FIGS. 2 and 3 with reference to the wheel assembly 26. The wheel assembly 26 has a rotatable wheel body 42 that is connected to an axle 44 by a ball joint 46.

Figure 2:
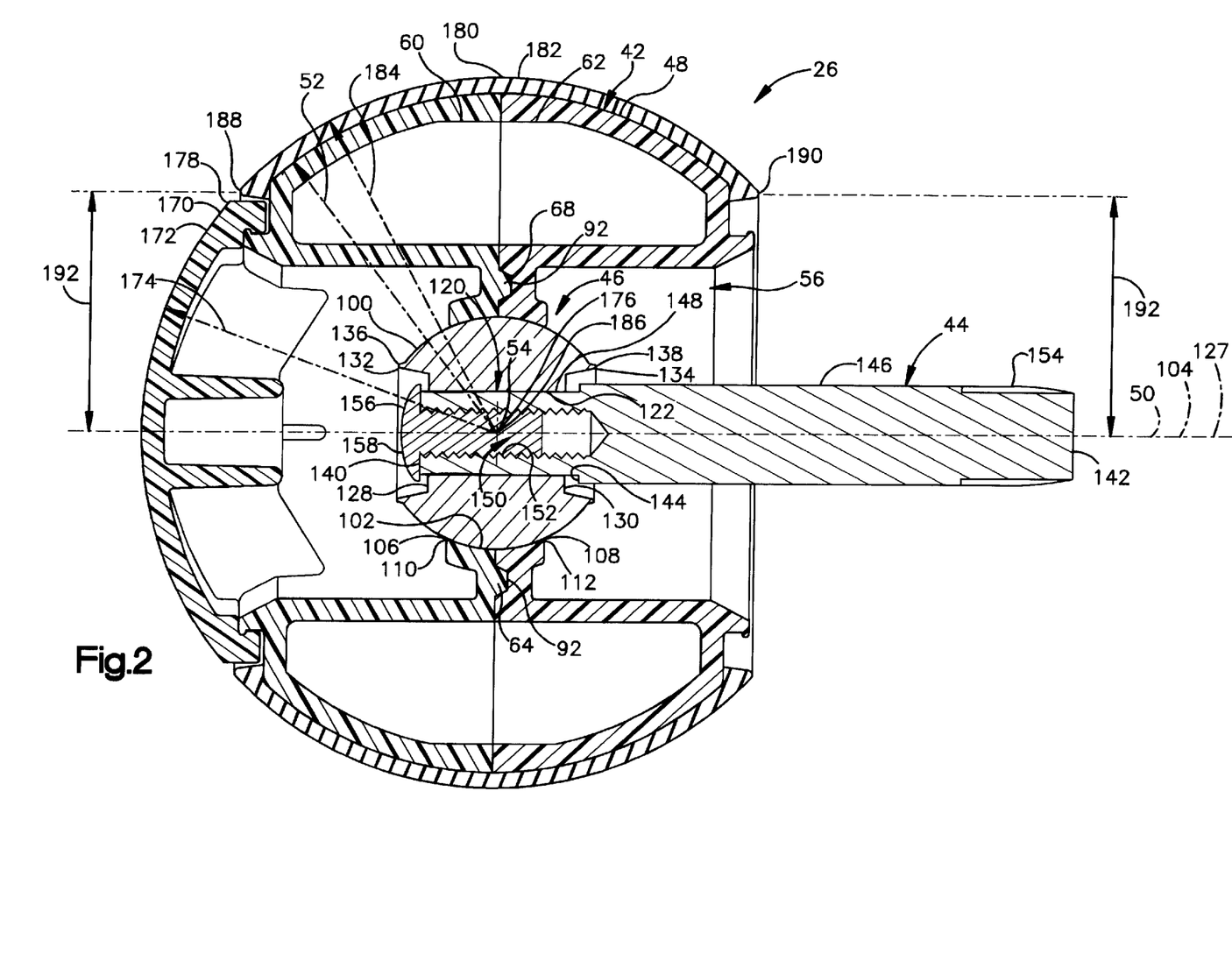
FIG. 2 is a side sectional view of parts of the vacuum cleaner of FIG. 1.

As best shown in FIG. 2, the wheel body 42 has a peripheral outer surface 48. The outer surface 48 has a spherical contour that is centered on and extends circumferentially about an axis of rotation 50. A radius of curvature 52 of the outer surface 48 has an origin 54 on the axis 50. A bore 56 extends axially outward from the ball joint 46 to the outer surface 48 for receiving the axle 44.

Figure 3:
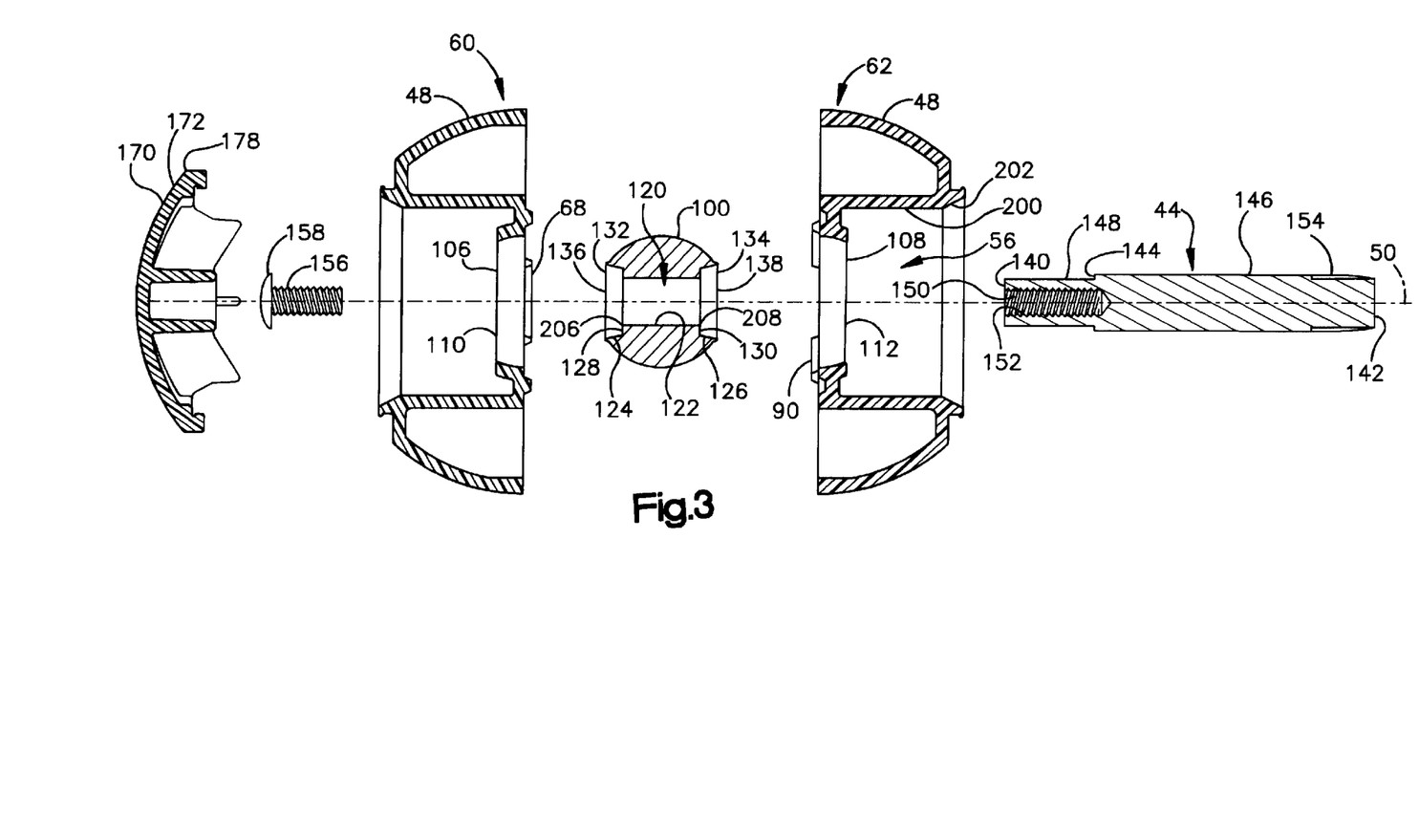
FIG. 3 is an exploded view of parts shown in FIG. 2.
Figure 4:
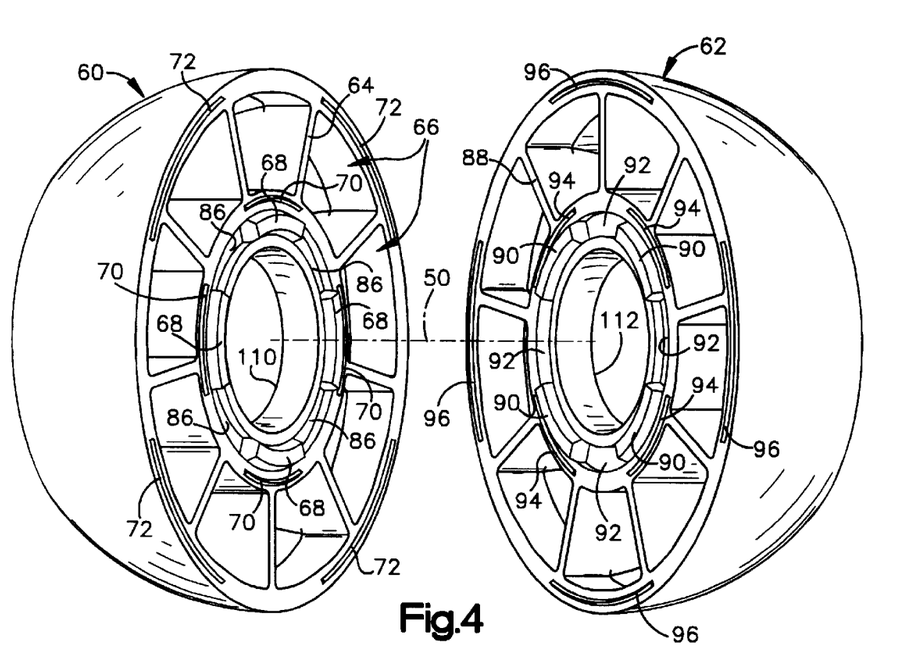
FIG. 4 is a perspective view of parts shown in FIG. 3.

The wheel body 42 is formed of first and second wheel sections 60 and 62 which are mated in axially opposed relationship. In the preferred embodiment, the wheel sections 60 and 62 are identical. As shown in FIG. 3, each wheel section 60 and 62 is molded as a one-piece plastic structure. As shown in FIG. 4, the first wheel section 60 has a web structure 64 defining compartments 66, and is thus lightweight yet rigid. The first wheel section 60 has four projections 68 arranged in a circular array. The circular array is centered on the axis 50 and is symmetric about the axis 50 in that the projections 68 are of equal size and shape and are uniformly spaced about the axis 50. Additionally, four inner arcuate welding ridges 70 are disposed in a circular array that is centered on the axis 50 and is likewise symmetric about the axis 50. Similarly, four outer arcuate welding ridges 72 are disposed in a circular array that is centered on the axis 50 and is likewise symmetric about the axis 50.

Figure 5:
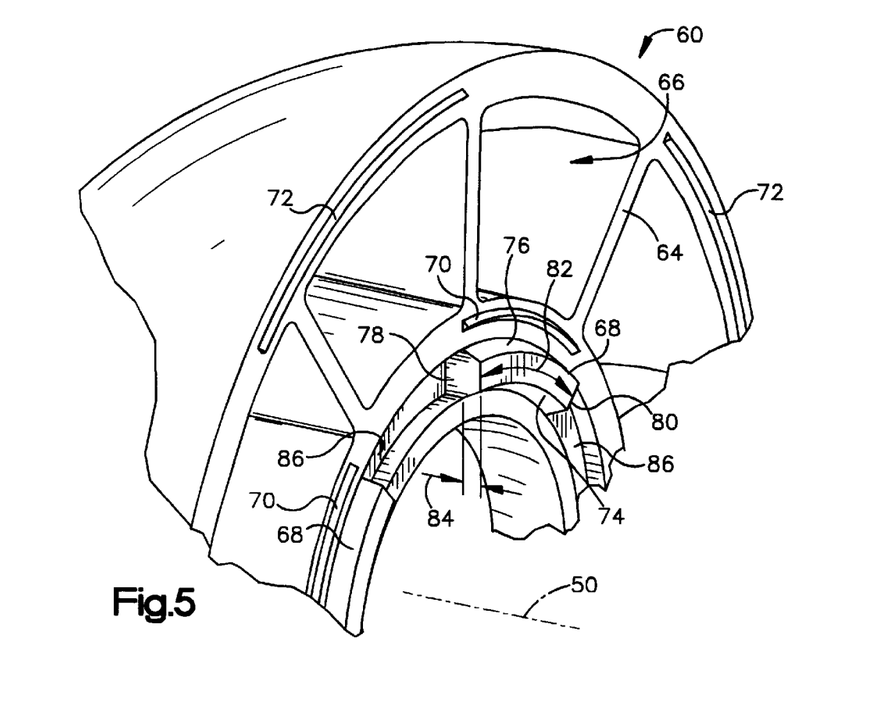
FIG. 5 is a partial view of a part shown in FIG. 4.

As shown in FIG. 5, each of the projections 68 has a rectangular cross-section and extends slightly less than 45° circumferentially about the axis 50. In the preferred embodiment, the projections 68 are alike. Each of the projections 68 has two oppositely facing arcuate surfaces 74 and 76 that are elongated circumferentially about the axis 50. The arcuate surfaces 74 and 76 are bounded by two opposite end surfaces 78 and 80. Each of the projections 68 has an arcuate length 82 and an axial length 84 that is less than the arcuate length 82. Four recesses 86 are interposed between the four projections 68. In the preferred embodiment, the four inner welding ridges 70 are alike, and the four outer welding ridges 72 are alike. Each of the inner and outer welding ridges 70 and 72 has a triangular cross-section and extends slightly less than 45° circumferentially about the axis 50.

As shown in FIG. 4, the second wheel section 62 also has a web structure 88, four projections 90, four recesses 92, four inner welding ridges 94 and four outer welding ridges 96. When the wheel sections 60 and 62 are assembled together, the projections 68 of the first wheel section 60 are received by the recesses 92 of the second wheel section 62. Similarly, the recesses 86 of the first wheel section 60 receive the projections 90 of the second wheel section 62. The end surfaces 78 and 80 of each projection 68 on the first wheel section 60 are spaced a small distance circumferentially from the adjacent end surfaces 78 and 80 of the adjacent projections 90 on the second wheel section 62. The resulting clearances between adjacent end surfaces 78 and 80 help to ensure that the projections will fit within the recesses despite dimensional variations in manufacturing. However, since these clearances are small, the range of rotation of the wheel sections 60 and 62 relative to each other about the axis 50 is limited. The range of rotation is sufficiently limited to ensure that the wheel sections 60 and 62 are aligned relative to each other such that the welding ridges 70 and 72 of the first wheel section 60 do not overlap the welding ridges 94 and 96 of the second wheel section 62.

During assembly of the wheel body 42 (FIG. 2), the wheel sections 60 are 62 are manually mated together by an operator. While holding the wheel sections 60 and 62 together, the operator may have to rotate the first wheel section 60 up to nearly 90° before reaching a proper orientation where the projections 68 and 90 mate with the opposed recesses 86 and 92. Four projections 68 per wheel section 60 is preferred and may be optimum. Fewer projections would increase the rotation required to reach a proper orientation. The wheel sections 60 and 62 are sonically welded together by use of sonically welding techniques that are known in the art. The welding ridges 70, 72, 94 and 96 melt and fuse so as to bond the wheel sections 60 and 62 together. Depressions (not shown) are located adjacent the welding ridges 70, 72, 94 and 96 to prevent melted plastic from reaching the outer surface 48 of the wheel body 42 (FIG. 2).

Figure 6:
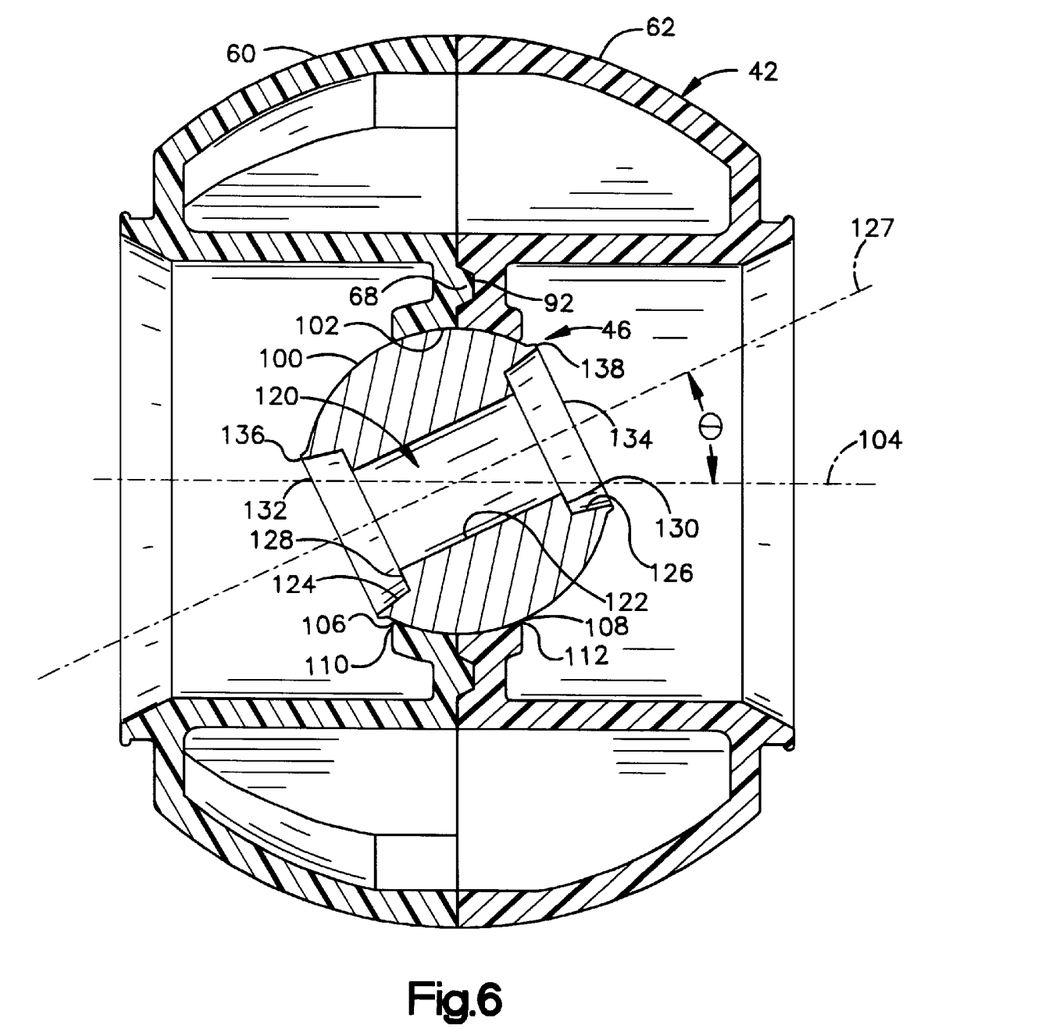
FIG. 6 is a side sectional view of parts shown in FIG. 2.

As best shown in FIG. 6, the ball joint 46 includes a bearing in the form of a ball 100 received in a socket 102. The socket 102 is a cavity within the wheel body 42, and is centered on an axis 104. The socket 102 has first and second axially opposite open ends 106 and 108. The first open end 106 is surrounded by an annular first edge 110 of the wheel section 60. Similarly, the second open end 108 is surrounded by an annular second edge 112 of the wheel section 62.

The ball 100 is rotatable in all directions relative to the wheel body 42. The ball 100 has a bore 120 defined by a cylindrical surface 122 and two opposite conical inner surfaces 124 and 126, all centered on a central axis 127 of the ball 100. The conical inner surfaces 124 and 126 are diametrically larger than the cylindrical inner surface 122 and are radially spaced from the cylindrical inner surface 122 by first and second annular abutment shoulders 128 and 130. The annular abutment shoulders 128 and 130 extend radially inward within the bore 120 and face opposite of each other. Two annular outer ends 132 and 134 of the ball bore 120 are surrounded by two annular ribs 136 and 138 extending outward from the ball 100.

When the wheel sections 60 and 62 and the ball 100 and are assembled together, the ball 100 can rotate to change an angle θ between the central axis 104 of the wheel body 42 and the central axis 127 of the ball 100. The ball 100 can rotate only within a predetermined range of rotation. The range of rotation is limited by the ribs 136 and 138 being movable into abutment with the socket edges 110 and 112, as illustrated in FIG. 6. This prevents the ball 100 from rotating to an orientation in which all or part of the outer ends 132 and 134 of the bore 120 are obscured by the socket 102. This ensures that the bore 120 in the ball 100 is suitably oriented for insertion of the axle 44 (FIG. 2).

As best shown in FIG. 3, the axle 44 has opposite first and second end surfaces 140 and 142. An annular abutment shoulder 144 on the axle 44 is spaced from the second end surface 142 by a cylindrical shank 146. The abutment shoulder 144 is spaced from the first end surface 140 by a cylindrical shaft 148 that is diametrically smaller than the shank 146. The shaft 148 is axially longer and diametrically smaller than the cylindrical inner surface 122 in the ball 100. A bore 150 extending axially inward through the first end surface 140 has an internal screw thread 152. The axle 44 has a straight knurl 154 adjacent to the second end surface 142. The knurl 154 provides a secure interference fit with the lever arm 38 (FIG. 1) when the axle 44 is press fitted into a bore 155 in the lever arm 38.

As shown in FIG. 2, the axle 44 is received within the bore 56 in the wheel body 42. The axle 44 is further received within the ball bore 120 and is fastened to the ball 100 with a screw 156 having a head 158. The screw 156 is tightened within the axle bore 150 until the screw head 158 firmly abuts the first end surface 140 of the axle 44. The first abutment shoulder 128 on the ball 100 faces the screw head 158 with a small clearance in-between. The second abutment shoulder 130 on the ball 100 faces the abutment shoulder 144 on the axle 44 with a small clearance in-between. These clearances provide the ball 100 with a limited range for axial movement relative to the axle 44. Additionally, as mentioned above, the shaft 148 is diametrically slightly smaller than the cylindrical inner surface 122, so the shaft 148 fits closely but loosely within the cylindrical inner surface 122. This close but loose fit combined with the clearances described above enable rotational sliding contact and axial sliding contact between the shaft 148 and the cylindrical inner surface 122. The ball 100 is thus free to rotate about the axle 44.

Figure 7:
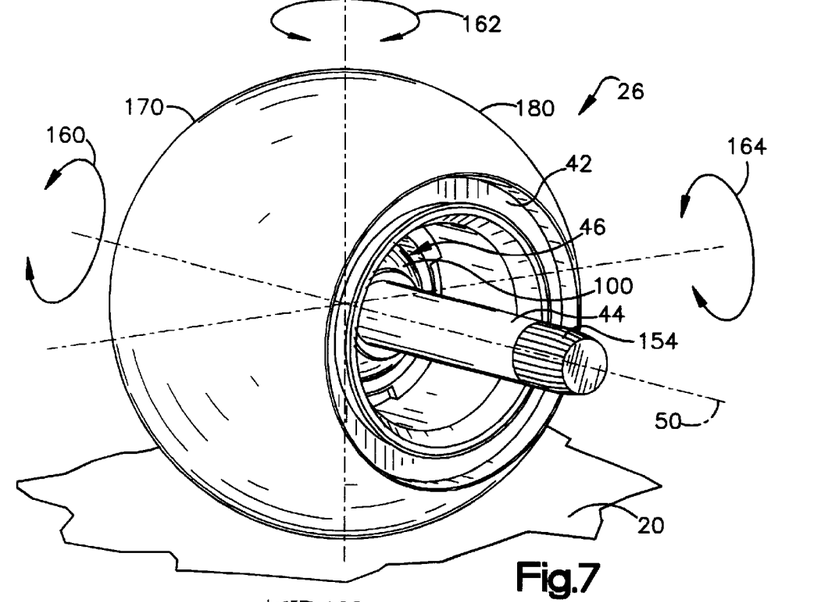
FIG. 7 is a perspective view of parts shown in FIG. 2.

As shown FIG. 7, since the wheel body 42 is attached to the axle 44 by the ball joint 46, the wheel body 42 can rotate in any direction relative to the axle 44 while rolling along the floor 20. This is illustrated by arrows 160, 162 and 164, which represent three orthogonal directions of rotation. Rotation in these three directions 160, 162 and 164, or a combination thereof, is enabled by slippage of the wheel body 42 about the ball 100. Additionally, rotation of the wheel body 42 about the axle 44, illustrated by the arrow 160, is further facilitated by rotational sliding contact between the ball 100 and the axle 44, as described above. This promotes efficient rotation of the wheel body 42.

As shown in FIGS. 2 and 3, a hubcap 170, which in this embodiment is removable, is snapped onto the wheel body 42. The hubcap 170 has a peripheral outer surface 172 having a spherical contour centered on the axis 50. The outer surface 172 has a radius of curvature 174 with an origin 176 on the axis 50. The origin 176 of the outer surface 172 of the hubcap 170 is coincident with the origin 54 of the outer surface 48 of the wheel body 42. A circular edge 178 of the outer surface 172 of the hubcap 170 is centered on the axis 50.

As shown in FIG. 2, the wheel body 42 is surrounded by a one-piece overmolded tread 180 that overlays both wheel sections 60 and 62. The tread 180 covers all portions of the wheel assembly 26 that can contact the floor 20 (FIG. 1) as the wheel body 42 rolls about the floor 20.

An outer surface 182 of the tread 180 has a spherical contour that is centered on the axis 50. A radius of curvature 184 of the outer surface 182 of the tread 180 is equal to the radius of curvature 174 of the outer surface 172 of the hubcap 170. An origin 186 of the radius of curvature 184 of the outer surface 182 of the tread 180 is coincident with the origins 54 and 176 of the outer surface 48 of the wheel body 42 and the outer surface 172 of the hubcap 170. First and second circular edges 188 and 190 of the tread 180 are centered on the axis 50. The first edge 188 of the tread 180 is located radially outward from the edge 178 of the hubcap 170. The first and second edges 188 and 190 of the tread 180 have the same size and shape, and thus have the same radius 192.

As explained above with reference to FIG. 1, the rear wheels 22 and 24 rotate only about the central axis 32 of the rear axle 30. In contrast, each wheel body 42 (FIG. 7) of the front wheel assemblies 26 and 28 can rotate in any direction. As the vacuum cleaner base 12 is being pushed forward and pulled backward, it is steered by the handle 14 to move the base 12 in an arcuate path along the floor 20. Since the wheel bodies 42 (FIG. 7) of the front wheel assemblies 26 and 28 can rotate in any direction, they can pivot accordingly to continue rolling without skidding. The front wheel assemblies 26 and 28 thus have a steerability that is absent in the rear wheels 22 and 24.

In the preferred embodiment, shown in FIG. 2, the wheel body 42 is formed of a relatively stiff plastic so that the outer surface 48 maintains a spherical shape for efficient rolling. The hubcap 170 is formed of softer plastic than that of the wheel body 42. This minimizes scratching of household surfaces that the hubcap 170 might rub against. The tread 180 is formed of softer plastic than that of the hubcap 170. The ball 100 is formed of a rigid low-friction plastic. The axle 44 is formed of steel.

Figure 8:
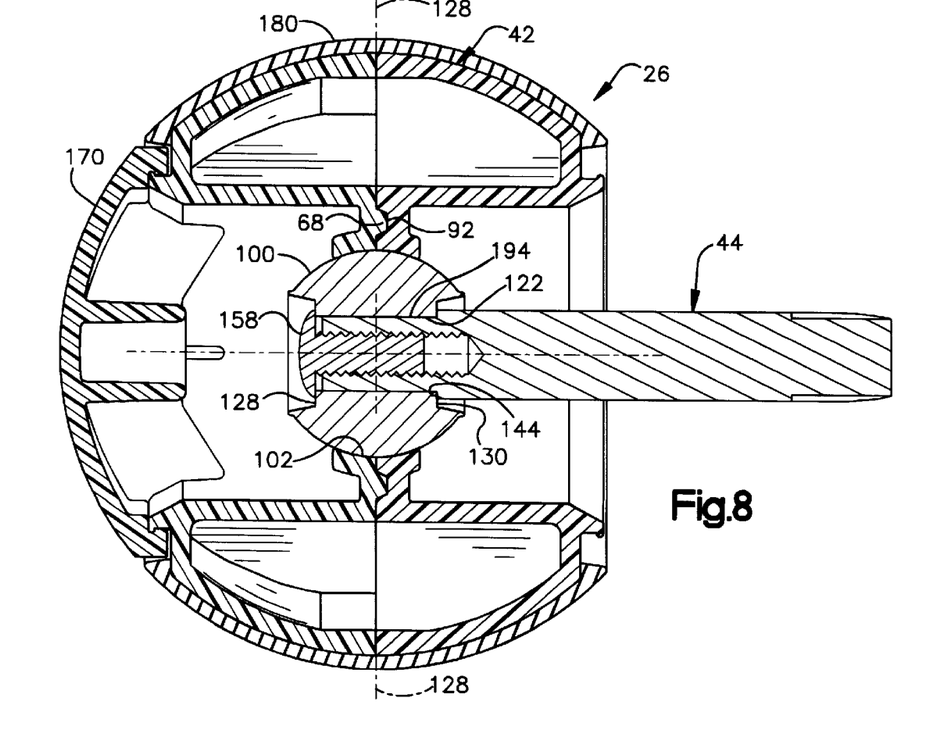
FIG. 8 is a side sectional view of parts of another embodiment of the present invention.

The structure shown in FIG. 8 has many parts that are the same as corresponding parts shown in FIG. 2. This is indicated by use of the same reference numbers for such parts in FIGS. 8 and 2. However, the shaft 194 of FIG. 8 has a different structure than the shaft 148 of FIG. 2. Specifically, whereas the shaft 148 of FIG. 2 is axially longer than the cylindrical inner surface 122 of the ball 100, the shaft 194 of FIG. 8 is axially shorter than the cylindrical inner surface 122. In FIG. 8, the first abutment shoulder 128 in the ball 100 forcibly abuts the screw head 158, and the second abutment shoulder 130 in the ball 100 forcibly abuts the axle abutment shoulder 144. The ball 100 is thus tightly secured to the axle 44 and cannot rotate about the axle 44. Therefore, rotation of the wheel body 42 in any direction is enabled only by slippage of the wheel body 42 about the ball 100.

Figure 9:
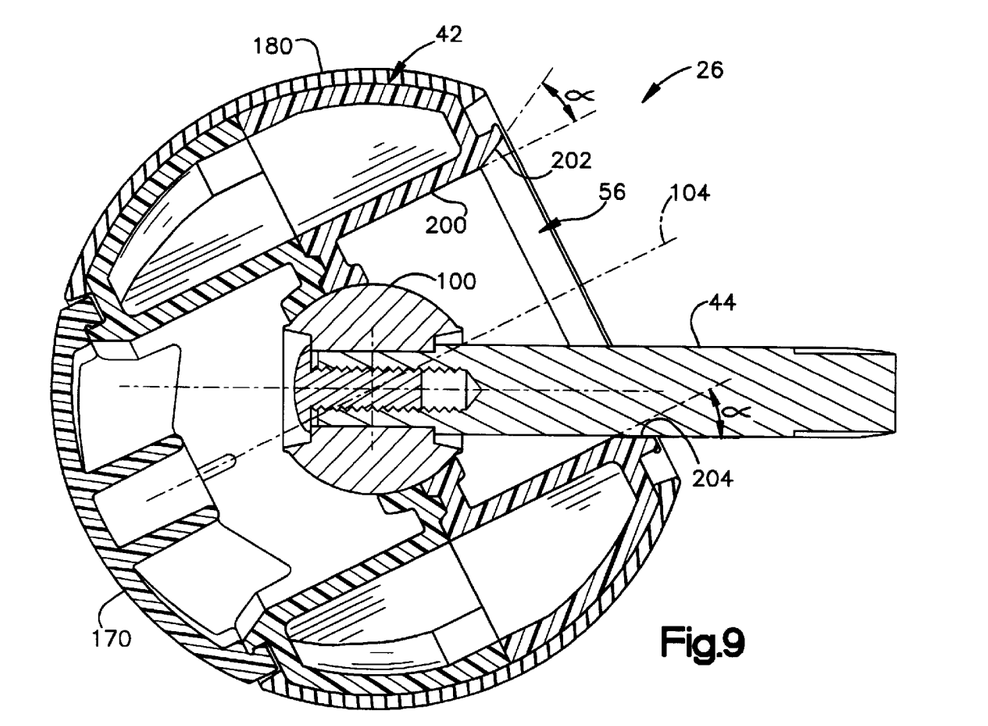
FIG. 9 is a side sectional view of parts shown in FIG. 2.

Yet another feature of the present invention is illustrated in FIG. 9 with reference to the first embodiment. In accordance with this feature of the invention, the bore 56 is defined by a cylindrical surface 200 and a conical beveled surface 202 at the outer end of the cylindrical surface 200. Both surfaces 200 and 202 are centered on the central axis 104 of the wheel body 42. The beveled surface 202 is at an angle α relative to the cylindrical surface 200. In FIG. 9, the wheel body 42 is oriented such that the beveled surface 202 abuts the axle 44. The bevel angle α is selected such that the axle 44 abuts the bevel surface 202 along a line of contact 204 instead of along a point of contact. Force from the axle 44 is distributed along the full line of contact 204 and is thus less likely to form an impression in the wheel body 42.

Figure 10:
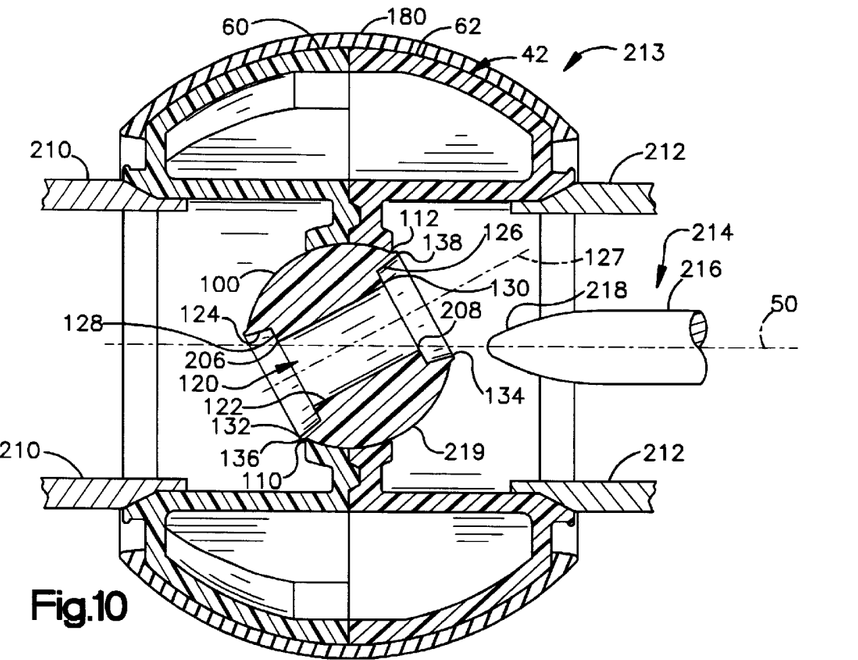
FIGS. 10–12 are side sectional views of parts shown in FIG. 2, illustrating a procedure according to the present invention.
Figure 11:
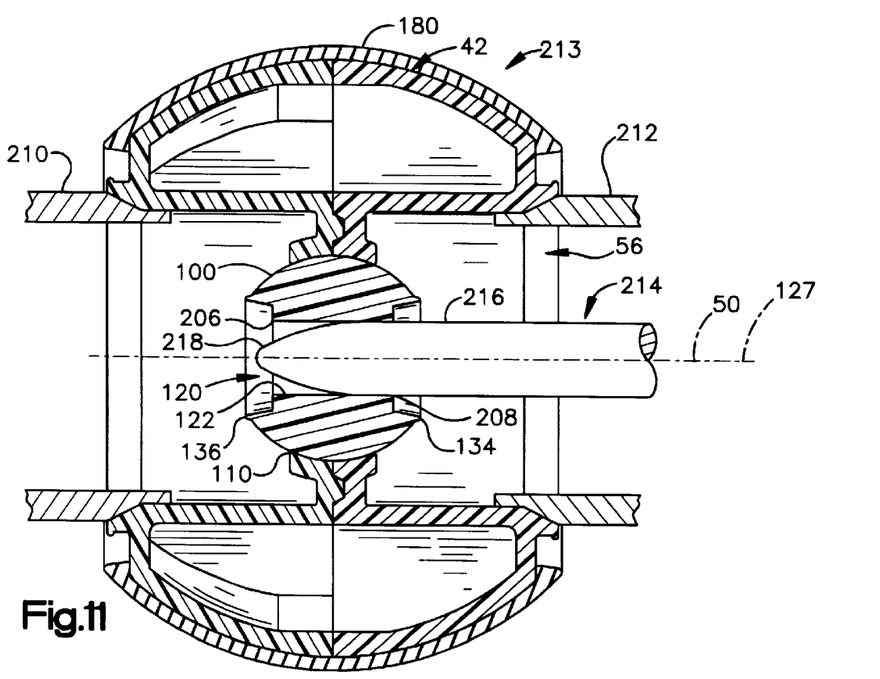
Figure 12:
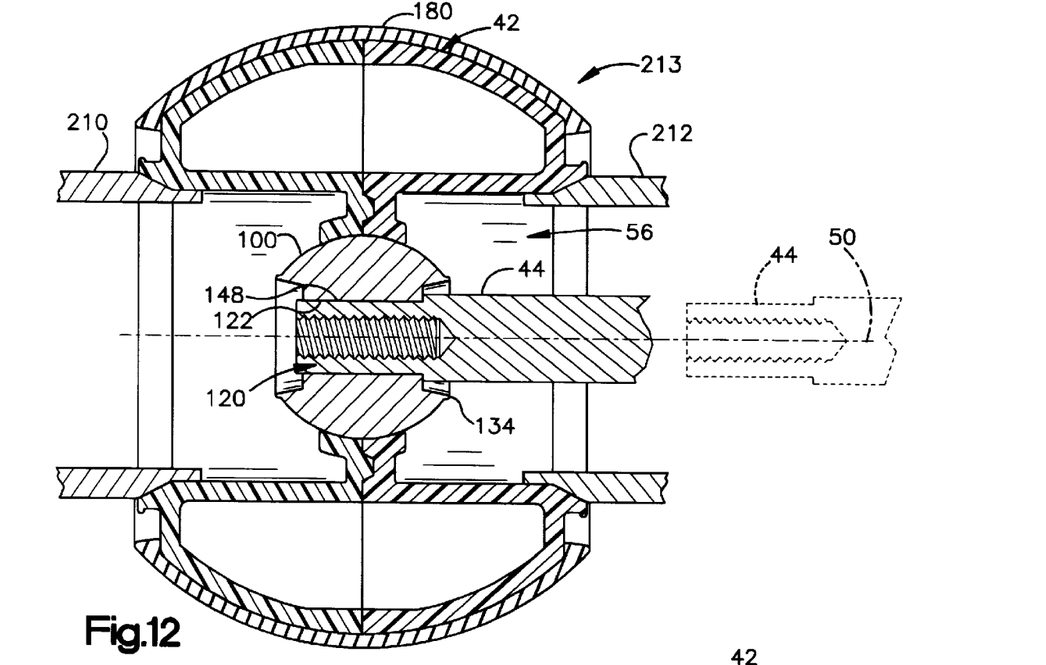
Figure 13:
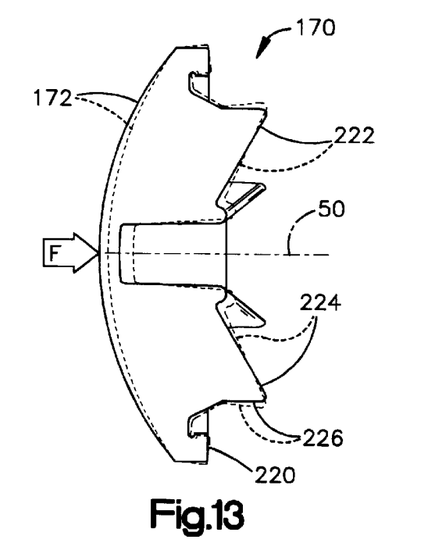
FIGS. 13–14 are side sectional views of parts shown in FIG. 2.

Still another feature of the present invention is illustrated in FIGS. 10–12 with reference to the first embodiment. As shown in FIG. 10, the cylindrical inner surface 122 of the ball 100 has two opposite end edges 206 and 208. In the manufacturing process, the wheel sections 60 and 62 and the ball 100 are assembled together. Next, the tread 180 is overmolded about the wheel body 42. As shown in FIG. 10, the resulting subassembly 213, comprising the wheel body 42, the ball 100 and the tread 180, is then clamped between two cylindrical holders 210 and 212. The subassembly 213 is clamped such that the wheel body 42 is centered on the axis 50. The ball 100 can rotate relative to the wheel body 42 until the ribs 136 and 138 abut the socket edges 110 and 112. An alignment tool 214 is used to align the ball bore 120 properly for inserting the axle 44 (FIG. 13). The alignment tool 214 has a cylindrical barrel 216 and a bullet-shaped tip 218. The barrel 216 has a cylindrical outer diameter that is sized to enable the barrel 216 to fit closely but loosely within the cylindrical inner surface 122.

In the manufacturing process, the alignment tool 214 is centered on the axis 50 with the tip 218 facing the ball 100, as shown in FIG. 10. The alignment tool 214 moves in a straight motion along the axis 50 toward the ball 100. As the tip 218 enters the ball bore 120, the alignment tool 214 moves against the second ball end 134 and the second ball edge 208. This rotates the central axis 127 of the ball 100 into alignment with the central axis 50 of the alignment tool 214. As shown in FIG. 11, when the barrel 216 is received by the cylindrical inner surface 122 of the ball 100, the ball bore 120 is centered on the axis 50. Since the barrel 216 fits closely within the cylindrical inner surface 122, rotation of the ball 100 relative to the barrel 216 is limited. The alignment tool 214 is then axially withdrawn from the ball bore 120. In a subsequent step, as shown in FIG. 12, the axle 44 is centered on the axis 50 away from the ball 100, as shown in dashed lines. The axle 44 is then moved axially toward the ball 100 and is received by the ball bore 120, as shown in solid lines.

Insertion of the axle 44 into the ball bore 120, as described above, is performed through factory automation. Therefore, the ball bore 120 must be precisely aligned beforehand by the alignment tool 214 (FIG. 10). Insertion of the alignment tool 214 into the ball bore 120 is also performed through factory automation. Therefore, as illustrated in FIG. 10, the ball is configured such that, throughout the range of rotation of the ball 100, the inner ball surfaces 122, 124, 126, 128 and 130 are spaced from the axis 50 and do not cross the axis 50. This ensures that the tip 218 of the alignment tool 214 does not strike the shoulder 126, the conical inner surface 130 or an outer surface 219 of the ball 100.

Figure 14:
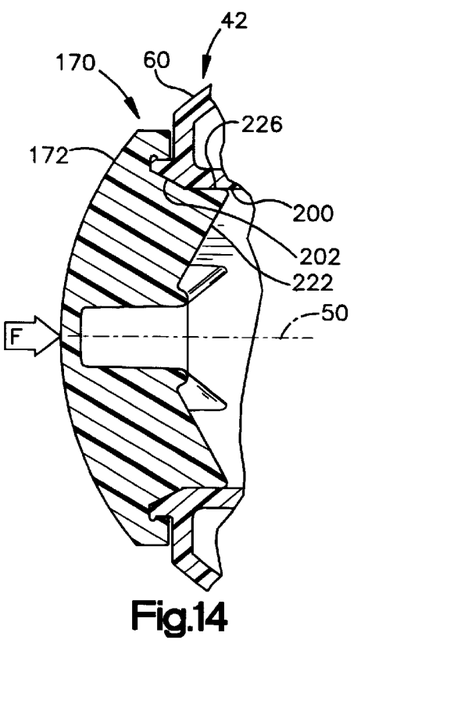

Another feature of the present invention relates to the design of the hubcap 170. As shown in FIG. 13 in solid lines, the hubcap 170 has an annular snap ring 220 to secure the hubcap 170 to the wheel body 42 (FIG. 14). Reinforcement ribs 222 prevent the hubcap 170 from deforming when the hubcap 170 collides with a household surface. The ribs 222 have radially extending edges 224 and axially extending edges 226. When the hubcap 170 is secured by the snap ring 220 and the hubcap 170 impacts a household surface, a force F is applied along the axis 50. The force F imparts stress that would tend to cause the hubcap outer surface 172 to bow axially inward and the axially extending edges 226 to bow radially outward, as illustrated in dashed lines. As shown in FIG. 14, the shape of the axially extending edges 226 match the shape of the cylindrical surface 200 and the bevel surface 202 of the wheel body 42. Each of the axially extending edges 226 abuts the cylindrical surface 200 over a significant length of the axially extending edge 226. This prevents the axially extending edges 226 from bowing outward and consequently prevents the hubcap outer surface 172 from bowing inward. Alternatively, the edges 226 could be spaced radially inward from the cylindrical surface 200. Such spaced edges could serve to guide the hubcap 170 along while it is being installed.

Yet another feature of the present invention is the use of symmetry of components and symmetry of subassemblies to simplify manufacture. As shown in FIG. 2, the axle 44, the ball 100, the wheel sections 60 and 62, the wheel body 42, and the wheel body 42 with the tread 170 attached are all symmetric about the axis 50. Also, peripheral surfaces of the ball 100, the wheel body 42, and the wheel body 42 with the tread 170 attached are also symmetric relative to a plane of symmetry 228, as shown in the assembled relationship of FIG. 8. Furthermore, the wheel sections 60 and 62 are identical.

Figure 15:
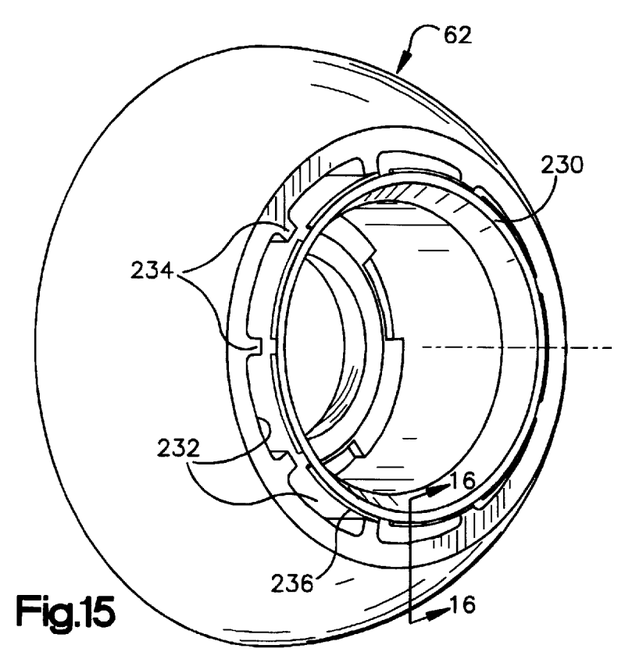
FIG. 15 is a perspective view of a part according to yet another embodiment of the invention.
Figure 16:
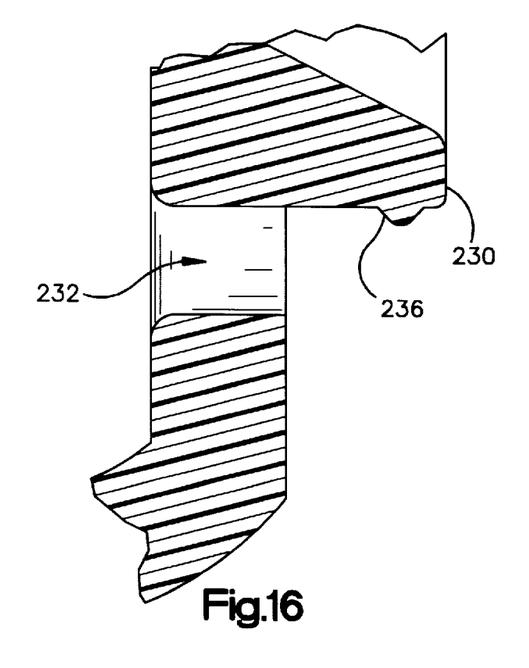
FIG. 16 is a sectional view taken on line 16—16 of FIG. 15.

Another embodiment is shown in FIGS. 15 and 16 with reference to the second wheel section 62. The wheel section 62 has a segmented snap ring 230. The wheel section 62 also has a circular array of rectangular gaps 232 interposed between struts 234. When the wheel section 62 is molded in a molding machine (not shown), tooling inserts (not shown) protrude through the rectangular gaps 232 to form a backside 236 of the snap ring 230. The snap ring 230 is discontinuous at locations adjacent to the struts 234.

The invention has been described with reference to preferred embodiments. Those skilled in the art will perceive improvements, changes and modifications. Such improvements, changes and modifications are intended to be within the scope of the claims.

What is claimed is:

1. An apparatus comprising:
    a rotatable wheel body having a peripheral outer surface extending circumferentially about an axis of rotation, said wheel body further having a cavity and a bore, said cavity being centered on said axis and configured to receive a bearing, and said bore extending axially outward from said cavity to said outer surface; and
    a bearing receivable within said cavity, said bearing having a bore configured to receive an axle inserted through said bore in said wheel body;
    said bearing and said wheel body together being configured to define a limited range of rotational movement of said bearing relative to said wheel body.

2. An apparatus as defined in claim 1 wherein said bearing is a ball portion of a ball joint, and said cavity is a socket of said ball joint.

3. An apparatus as defined in claim 2 wherein said limited range of rotational movement is defined by a projection extending outward from said ball portion that is movable into abutment with said wheel body upon rotation of said ball portion relative to said wheel body within a predetermined range of rotation.

4. An apparatus as defined in claim 3 wherein said projection is an annular rib surrounding an annular outer edge of said bore in said bearing, and said rib is movable into abutment with said wheel body to prevent any part of said outer edge from being obscured by said socket.

5. An apparatus as defined in claim 4 wherein said bore is defined by a bore surface, and said bore surface is configured such that, throughout said limited range of rotational movement, said bore surface is spaced from said axis.

6. An apparatus comprising:
   a hubcap having a first outer surface with a spherical contour centered on an axis of rotation, said first outer surface having a first radius of curvature and a circular first edge extending circumferentially about said axis; and
   a tread having a second outer surface with a spherical contour concentric with said contour of said first outer surface, said second outer surface further having a second radius of curvature equal to said first radius of curvature and a circular second edge extending circumferentially about said axis radially outward of said first circular edge.

7. An apparatus as defined in claim 6 further comprising a wheel body having a third outer surface with a spherical contour concentric with said contour of said first outer surface, said third outer surface further having a third radius of curvature smaller than said second radius of curvature.

8. An apparatus as defined in claim 7 wherein said hubcap is removably attached to said wheel body.

9. An apparatus as defined in claim 6 wherein said tread further has a circular third edge extending circumferentially about said axis and having the same radius as said second edge.

10. An apparatus comprising:
    a rotatable wheel body having a peripheral outer surface extending circumferentially about an axis of rotation, a bearing cavity centered on said axis, and a bore surface defining a bore extending axially outward from said bearing cavity; and
    a hubcap configured to have an installed position on said wheel body, said hubcap having ribs, each of said ribs having an axially extending edge configured to contact said bore surface when said hubcab is in said installed position.

11. An apparatus as defined in claim 10 wherein said wheel body and said hubcap together define a releasably interlocking structure configured to enable releasably attaching said hubcap to said wheel body.

12. An apparatus comprising:
    a ball joint including a ball rotatably received in a socket, said ball having a cylindrical inner surface that is centered on a first axis and that defines a bore in said ball; and
    an alignment tool for rotating said ball relative to said socket;
    said alignment tool having a tapered tip that is centered on a second axis, said tapered tip being configured to rotate said ball relative to said socket to align said first axis with said second axis when said tapered tip is moved along said second axis into said bore; and
    said alignment tool further having a body portion extending from said tapered tip and centered on said second axis, said body portion having a cylindrical outer diameter that is sized to enable said body portion to be telescopically received within said cylindrical inner surface and to limit rotation of said ball relative to said body portion when said body portion is received within said bore.

13. An apparatus as defined in claim 12 wherein said ball and said socket are configured to define a limited range of rotational movement of said ball relative to said socket.

14. An apparatus as defined in claim 13 wherein said limited range of rotational movement is defined by a projection extending outward from said ball that is movable into abutment with said socket upon rotation of said ball relative to said socket within a predetermined range of rotation.

15. An apparatus comprising:
    a rotatable wheel body having a spherical outer surface configured to roll about an open surface, said wheel body having a socket which is centered on an axis of rotation and configured to receive a ball, said wheel body further having a bore which extends axially outward from said socket and which is configured to receive an axle, said bore having a conical beveled surface at an outer end of said bore;
    a ball receivable within said socket to form a ball joint; and
    an axle receivable within said bore and attachable to said ball;
    wherein said beveled surface is configured to be pivotally movable into abutting line contact with said axle when said wheel body, said ball and said axle are assembled together.

16. An apparatus as defined in claim 15 wherein said ball and said socket are configured to define a limited range of rotational movement of said ball relative to said socket.

17. An apparatus as defined in claim 16 wherein said limited range of rotational movement is defined by a projection extending outward from said ball that is movable into abutment with said socket upon rotation of said ball relative to said socket within a predetermined range of rotation.

18. A wheel of a vacuum cleaner, said wheel comprising:
    a socket;
    a ball received within said socket to form a ball joint such that said socket is rotatable about said ball; and
    an axle fastened to said ball such that said ball is rotatable about said axle.

19. A wheel of a vacuum cleaner, said wheel comprising:
    a socket;
    a ball configured to form a ball joint with said socket such that said socket is rotatable about said ball, said ball having a bore configured to receive an axle; and
    an axle configured to be received within said bore and to be fastened to said ball such that said ball is rotatable about said axle.

20. An apparatus comprising:
    a rotatable wheel body having a socket which is centered on an axis of rotation and configured to receive a ball, and further having a first bore which extends axially outward from said socket and which is configured to receive an axle;
    a ball configured to be received within said socket, said ball having a second bore configured to receive the axle and having a first abutment shoulder extending radially inward within said second bore;
    an axle receivable within said first and second bores, said axle having an end surface and a third bore extending axially inward through said end surface, said third bore configured to receive a fastener; and
    a fastener receivable within said third bore for fastening said axle to said ball, said fastener having a head portion that faces both said first abutment shoulder and said end surface of said axle when said axle is fastened to said ball.

21. An apparatus as defined in claim 20 wherein said ball further has a second abutment shoulder extending radially inward within said second bore and facing oppositely of said first abutment shoulder, and wherein said axle further has an abutment shoulder spaced from said end surface, said axle abutment shoulder configured to face said second abutment shoulder when said axle is fastened to said ball.

22. An apparatus as defined in claim 21 wherein said head portion applies sufficient force against said first abutment shoulder and said axle abutment shoulder applies sufficient force against said second abutment shoulder to prevent said ball from rotating about said axle.

23. An apparatus as defined in claim 21 wherein said ball is mounted on said axle in a manner such that said ball is free to rotate about said axle through sliding contact of said ball about said the axle.

24. An apparatus comprising:
first and second wheel sections configured to mate in axially opposed relationship to define a rotatable wheel body having a peripheral outer surface extending circumferentially about an axis of rotation, and having a bearing cavity centered on said axis;
each of said wheel sections having an axial projection and an axial recess configured to receive the projection on the other of said wheel sections to limit rotation of said wheel sections relative to each other about said axis when said wheel sections are received in said axially opposed relationship; and
said cavity being a socket configured to receive a bearing in the form of a ball portion of a ball joint.

25. An apparatus as defined in claim 24 further comprising a ball portion of a ball joint received in said cavity.

26. An apparatus as defined in claim 25 wherein said ball portion has a bore configured to receive an axle, and said ball portion and said wheel body together are configured to define a limited range of rotational movement of said ball portion relative to said wheel body.

27. An apparatus comprising:
first and second wheel sections configured to mate in axially opposed relationship to define a rotatable wheel body having a peripheral outer surface extending circumferentially about an axis of rotation, and having a bearing cavity centered on said axis;
each of said wheel sections having an axial projection and an axial recess configured to receive the projection on the other of said wheel sections to limit rotation of said wheel sections relative to each other about said axis when said wheel sections are received in said axially opposed relationship;
said projection being one of a plurality of projections spaced apart from each other in a circular array centered on said axis, and said recess being one of a plurality of recesses interposed between said projections; and
said projections being alike, each of said projections having two opposite arcuate surfaces that are elongated circumferentially around said axis, and said projections being of equal size and shape and uniformly spaced apart about said axis.

28. An apparatus as defined in claim 27 wherein each of said projections has an arcuate length and a lesser axial length.

29. An apparatus comprising:
first and second wheel sections configured to mate in axially opposed relationship to define a rotatable wheel body having a peripheral outer surface extending circumferentially about an axis of rotation, and having a bearing cavity centered on said axis;
each of said wheel sections having an axial projection and an axial recess configured to receive the projection on the other of said wheel sections to limit rotation of said wheel sections relative to each other about said axis when said wheel sections are received in said axially opposed relationship; and
said peripheral outer surface having a spherical contour.

30. An apparatus comprising:
first and second wheel sections configured to mate in axially opposed relationship to define a rotatable wheel body having a peripheral outer surface extending circumferentially about an axis of rotation, and having a bearing cavity centered on said axis;
each of said wheel sections having an axial projection and an axial recess configured to receive the projection on the other of said wheel sections to limit rotation of said wheel sections relative to each other about said axis when said wheel sections are received in said axially opposed relationship; and
said apparatus further comprising a one-piece tread which is overmolded over said wheel body and which has a peripheral outer surface having a spherical contour.

31. An apparatus comprising:
first and second wheel sections configured to mate in axially opposed relationship to define a rotatable wheel body having a peripheral outer surface extending circumferentially about an axis of rotation, and having a bearing cavity centered on said axis;
each of said wheel sections having an axial projection and an axial recess configured to receive the projection on the other of said wheel sections to limit rotation of said wheel sections relative to each other about said axis when said wheel sections are received in said axially opposed relationship; and
said wheel sections being alike, and each of said wheel sections further comprising an arcuate welding ridge configured to be spaced from a welding ridge on the other of said wheel sections when said wheel sections are received in said axially opposed relationship.

32. An apparatus as defined in claim 1 wherein said peripheral outer surface has a spherical contour.

33. An apparatus as defined in claim 1 further comprising a one-piece tread which is overmolded over said wheel body and has a peripheral outer surface with a spherical contour.

34. An apparatus as defined in claim 1 wherein said wheel body is defined by first and second wheel sections configured to mate in axially opposed relationship, each wheel section having an axial projection and an axial recess configured to receive the projection on the other of said wheel sections to limit rotation of said wheel sections relative to each other about said axis when said wheel sections are received in said axially opposed relationship.

35. An apparatus as defined in claim 6 wherein said tread is a one-piece tread which is overmolded over a wheel body that is attached to said hubcap.

36. An apparatus as defined in claim 6 further comprising a wheel body supporting said tread, said wheel body having a bearing cavity centered on said axis and a bore surface defining a bore extending axially outward from said bearing cavity, and wherein said hubcap has ribs, each of said ribs having an axially extending edge configured to contact said bore surface when said hubcap is in said installed position.

37. An apparatus as defined in claim 15 further comprising a one-piece tread which is overmolded over said wheel body and has a peripheral outer surface with a spherical contour.

38. An apparatus as defined in claim 15 wherein said wheel body is defined by first and second wheel sections configured to mate in axially opposed relationship, each wheel section having an axial projection and an axial recess configured to receive the projection on the other of said wheel sections to limit rotation of said wheel sections relative to each other about said axis when said wheel sections are received in said axially opposed relationship.

39. An apparatus as defined in claim 19 wherein said socket is centered on an axis and is defined by a wheel body, and said wheel body comprises first and second wheel sections configured to mate in axially opposed relationship, each wheel section having an axial projection and an axial recess configured to receive the projection on the other of said wheel sections to limit rotation of said wheel sections relative to each other about said axis when said wheel sections are received in said axially opposed relationship.

40. An apparatus as defined in claim 19 wherein said socket is defined by a wheel body that has a peripheral outer surface with a spherical contour.

41. An apparatus as defined in claim 19 wherein said socket is defined by a wheel body, and said apparatus further comprises a one-piece tread which is overmolded over said wheel body and which has a peripheral outer surface having a spherical contour.

42. An apparatus as defined in claim 19 wherein said socket is defined by a wheel body, and said ball and said wheel body together are configured to define a limited range of rotational movement of said ball relative to said wheel body.

43. An apparatus as defined in claim 19 wherein said socket is defined by a wheel body having a spherical outer surface configured to roll about an open surface, said wheel body further has a bore extending outward from said socket for receiving said axle, said bore has a conical beveled surface at an outer end of said bore, and said beveled surface is configured to be pivotally movable into abutting line contact with said axle when said wheel body, said ball and said axle are assembled together.

* * * * *